April 29, 1947.  M. M. LEVY  2,419,576
APPARATUS FOR MEASURING SHORT TIME INTERVALS
Filed Sept. 11, 1942  2 Sheets-Sheet 1

INVENTOR
M. M. Levy.
BY Loyd Hall Sutton
ATTORNEY

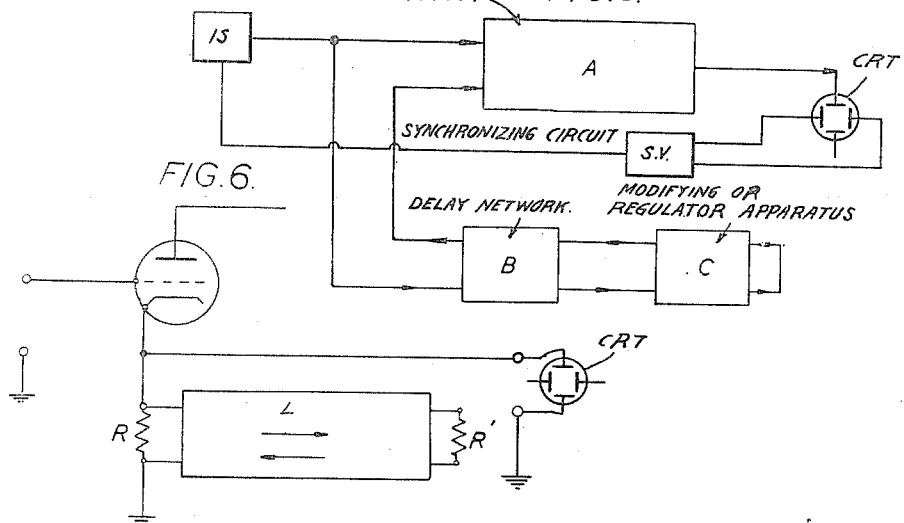
FIG. 5.
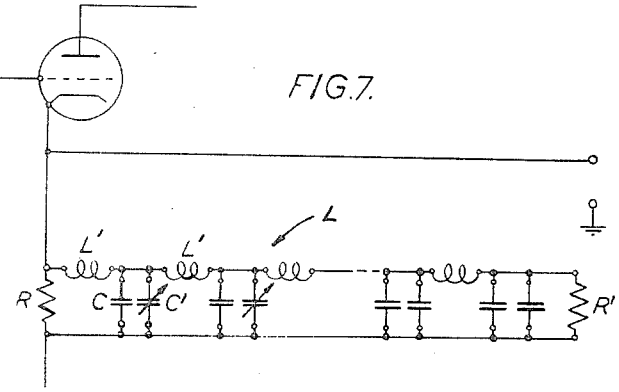
FIG. 6.
FIG. 7.
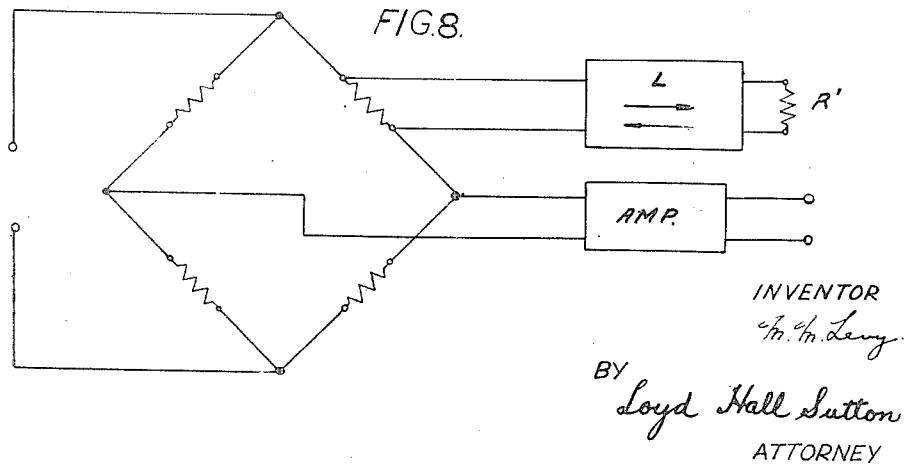
FIG. 8.

Patented Apr. 29, 1947

2,419,576

UNITED STATES PATENT OFFICE 2,419,576

APPARATUS FOR MEASURING SHORT TIME INTERVALS

Maurice Moise Levy, London W. C. 2, England, assignor to Standard Telephones and Cables Limited, London, England, a British company Application September 11, 1942, Serial No. 458,057
In Great Britain January 24, 1941

5 Claims. (Cl. 161—15)

This invention relates to apparatus for the measurement of the duration of electric impulses or signals or the interval of time between two electric impulses. Signal impulses are used in telegraphy and for the detection of obstacles by means of electro-magnetic radiation, and it is often necessary to know the duration of an impulse or the time between two points in its life curve with great accuracy. Such signal impulses, for example, may include one transmitted electro-magnetically and by reflection returned after a finite time interval for local reception. In order to measure this duration the signal can be reproduced on the screen of a cathode ray tube, and it is well known to measure the duration of the signal from the trace on the cathode ray tube assuming that the time sweep from a point of origin and the speed thereof are uniform. This method, however, presents in practice considerable difficulties, because it is very difficult to obtain a constant speed of sweep, above all if the signal itself has considerable variation of amplitude, and it is also difficult to calibrate the velocity of the time sweep.

According to the present invention there are provided means for obtaining a trace of a signal or primary impulse on the screen of a cathode ray tube and means for superimposing on said trace the trace of a further, or secondary, or echo, impulse produced therefrom after a measurable time delay. This superposed trace with its known time delay thus serves as a calibration with reference to which a signal trace may be read; and when its producing means is given known time delay adjustment to make it accord with the signal trace, the signal duration may be directly read.

The nature of the invention will be better understood from the following description, taken in conjunction with the accompanying drawings, in which Figs. 1a, 1b, 1c, 2a, 2b, 2c, 3a, 3b and 3c are diagrams illustrating the invention, whilst Figs. 4 to 8 show diagrammatically the means for obtaining the trace of an echo of the signal impulse.

Figure 1A:
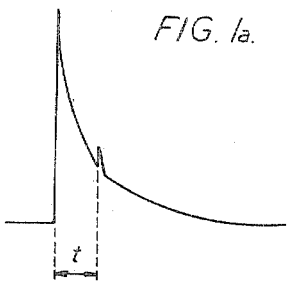

Referring now to the drawings, Fig. 1a shows the trace of a signal S in the form of an impulse having a steep front at the origin, and also a trace formed by an echo having the same form as the signal, and delayed in relation to the signal by time $t$ microseconds, each as it may appear on the screen of a cathode ray tube. Generally considered, if the primary and secondary impulses have similar forms, the duration of the interval may be read between corresponding points on the respective traces of the impulses. As the time for transmission of an echo through various forms of electrical networks can be accurately calculated, the formation of the trace of an echo on the screen of the tube as shown in Fig. 1a gives a very accurate means of calibrating the horizontal distances on the screen of the tube in terms of time. It is to be understood that the trace of the echo can be produced on a portion of the screen which is adjacent to a part of the impulse, the distance between which and the origin it is desired to measure with accuracy. The accuracy of measurement is obviously facilitated if both impulse and echo have steep fronts as shown.

The delay between the signal or primary impulse and the echo may be varied, and thus the time between the origin of the signal and any point whatever of the latter can be measured.

Figure 1B:
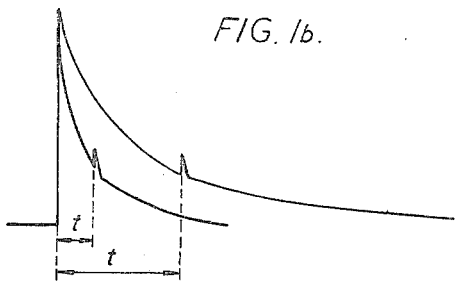
Figure 1C:
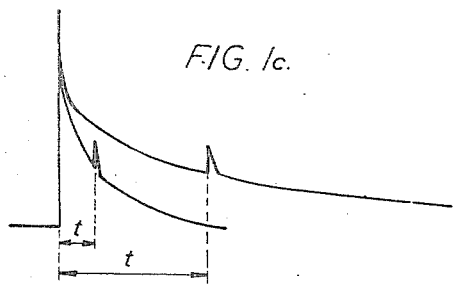

It is to be understood that variations of the velocity of the time sweep do not affect the accuracy of this form of measurement. In Fig. 1b for example, there are shown two forms of signal corresponding to two different time sweep velocities, and the same echo reproduced on each. The time which elapses between the origin of the signal and the front of the echo is the same in the two cases, although the distances between the origin of the signal and the echo are different. In Fig. 1c, for example, there are shown two different time sweep velocities which are identical at the origin but vary with time according to different laws, but the same remarks given above with relation to Fig. 1b are applicable also to the traces shown in Fig. 1c.

Figure 2A:
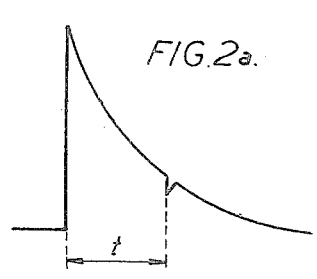
Figure 2B:
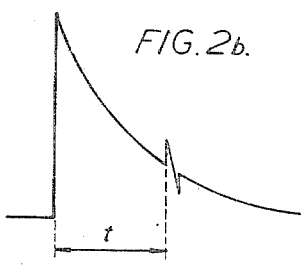
Figure 2C:
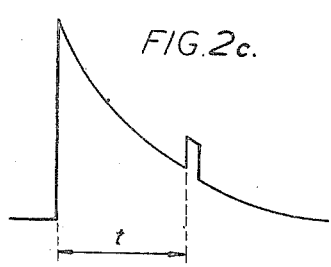

The echo need not be an exact reproduction of the signal. For example, in Fig. 2a is shown a signal impulse and a trace of an echo of an opposite sign to that of the signal, and in Fig. 2b is shown the same signal and an echo trace obtained by taking the differential of the signal. And lastly, in Fig. 2c, the same signal is shown, together with a trace obtained by producing a signal independent of the impulse but released with a predetermined delay by the signal itself.

Figure 3A:
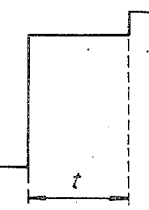
Figure 3C:
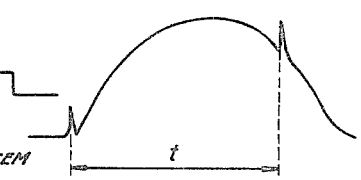
Figure 3B:
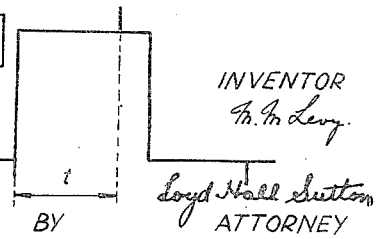

Fig. 3a shows a square shaped signal and an echo trace of the same shape superimposed thereon. Fig. 3b shows the same square shaped signal with an echo trace superimposed thereon which is the differential of the signal. Fig. 3c shows a trace of a form independent of the signal but formed at the origin of the signal and a second trace of the same kind released after a predetermined delay.

Figure 4:
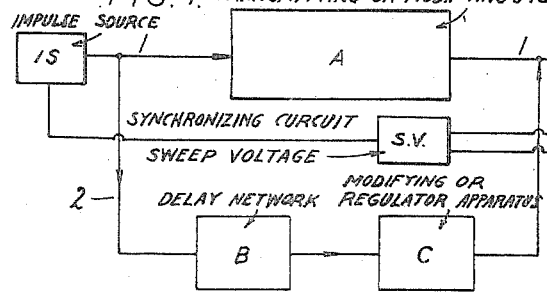

The simplest manner of producing the traces shown is illustrated diagrammatically in Fig. 4. The signal from an impulse source IS is transmitted to the cathode ray oscillograph CRT through a direct path 1, and through a branch path 2. The direct path may contain any system A transmitting or modifying the signal whilst the branch path serves to produce the echo. It comprises a delay network B and may also comprise apparatus C for modifying or regulating the form or the amplitude of the echo trace. It is to be understood that the usual sweep voltage supply SV controlled by a synchronizing circuit from the impulse source is provided.

Fig. 5 shows an arrangement in which the mixture of the direct signal and the echo is produced at the input of the transmission system A. In order to do this, the output of the system C must be connected to the input of the system A or to an intermediate point therein. A signal taken from the input of the system A is passed through systems B and C and then reflected back to the input of the system A. One way of realising this arrangement is shown in Fig. 6, in which the signal is applied between the control grid of a thermionic valve and earth, whilst the cathode is connected to earth through a resistance R in parallel with which is an artificial line L terminated in a resistance R'. If the resistance R' is equal to the characteristic impedance of the artificial line L, the signal is propagated through this line and is absorbed at its end. There is no reflection and the signal impulse does not suffer any deformation. If the line L is not terminated by its characteristic impedance, a reflection will take place and a signal will be impressed on the output connected between the cathode and earth, which is the original impulse and an echo thereof. The echo is in the same direction or inverted with respect to the signal according as the resistance R' is higher or lower than the characteristic impedance of the line L. The delay between the signal and the echo is a function of the electrical length of the line L and is easily adjusted and calculated.

Instead of acting upon the resistance terminating the line, an echo can be produced by varying other elements of the line. Fig. 7 shows, for example, an artificial line made up of inductances L' in series and capacities in shunt. Each shunt capacity is made up of a fixed capacity C and a small variable capacity C'. If all the shunt capacities are made equal, and the resistance R' is equal to the characteristic impedance of the line, there is no reflection, but a reflection may be produced of a type which is the differential of the signal by varying one of the capacities. If, for example, the signal is in the form of a rectangular-shaped impulse, the echo will have the form shown in Fig. 2b consisting of a sharp positive impulse and a sharp negative impulse. The delay of the echo in relation to the signal may be varied by acting upon the capacity at different distances from the end of the line. By altering one of the inductances L an echo may be produced having the same shape as the signal. It is evident that with an artificial line of this type an echo having a complex form in relation to that of the signal may also be produced.

It is to be understood that when the elements of this line are varied, the propagation of a signal along the line is no longer uniform, but changes a little. The signal is deformed and the delay between the signal and the echo is no longer accurately defined. Luckily in practice a single reflection may be produced with a very small distortion indeed, and the same is true also if the echo has a very small amplitude.

The artificial line should transmit practically all frequencies of the signal and of the echo without appreciable distortion, that is to say, without altering the form thereof appreciably.

Fig. 8 shows an arrangement by which multiple reflections may be produced with very small change in the characteristics of the line, whilst obtaining reflections of reasonable amplitude. Here the signal is applied to one diagonal of a balanced bridge, one of whose arms is constituted by the line L terminated as before in its characteristic impedance R'. Reflections of small amplitude may be first produced by small variations in the elements of the artificial line. These are then taken off from the opposite diagonal of the bridge and are amplified in an amplifier AMP to any extent desired. With this circuit an echo of a complex form may be produced, or the form of the echo may be simplified. In order to do this, a series of the variable capacities C' of Fig. 7 conveniently chosen may be varied. Of course the artificial line may be made up of other elements than inductances and capacities, and in particular the capacities may be replaced by variable resistances. The delay between the echo and the signal may be calculated quite readily from the elements making up the line, and in a line made up of uniform sections the number of sections before the place at which reflection is produced is proportional to the delay produced between the signal and the echo.

What is claimed is:

1. Timing apparatus comprising a cathode ray oscillograph having means for effecting periodic sweep deflecting of the ray, two transmission paths having propagation times whose difference is known, one of said paths comprising an adjustable delay network having known delay characteristics, means acting in synchronism with said sweep deflecting means for impressing impulses on both said paths simultaneously and means for connecting output from both said paths to the deflecting elements of the cathode ray oscillograph to produce a composite trace in a direction different from that of the sweep deflection, whereby the distance along the sweep direction between those components of the composite trace due to one transmission path and the corresponding ones due to the other path represents said known difference of propagation time independently of the rate of sweep deflection.

2. Apparatus according to claim 1 wherein said delay network consists of a series of equal sections and is terminated in its characteristic impedance, each of said sections consisting of series and shunt reactances, one of said reactances in at least one section being slightly variable from its primary value to cause a reflection to occur at that section.

3. Apparatus according to claim 1 wherein is included in one of said paths a thermionic amplifier, means for impressing the impulses on the input electrodes thereof, the other said path being connected to the lead to one of said electrodes and comprising a delay network variable to cause reflection therein.

4. Apparatus according to claim 1 wherein said delay network is terminated in an impedance different from the characteristic impedance of the network to cause a reflection of a signal applied thereto.

5. Timing apparatus comprising a source of primary impulses, a cathode ray oscillograph having means acting in synchronism with said primary impulses for effecting periodic sweep deflections of the ray, means for deriving from said primary impulses respective secondary impulses a predetermined time after the primary impulses comprising a delay network, and means for impressing a primary impulse and its derived secondary impulse on the cathode ray oscillograph to produce their respective traces in a direction different from that of the sweep deflection comprising a bridge network having in one of its arms an impedance shunted by said delay network, so constructed and arranged as normally not to produce any impulse reflection, the bridge network in that condition being balanced, means for applying the primary impulses across one diagonal of the bridge, an output circuit connected across the other diagonal of the bridge, and means for varying said delay network to cause reflection to be produced therein after a predetermined time.

MAURICE MOISE LEVY.

REFERENCES CITED

The following references are of record in the file of this patent:

UNITED STATES PATENTS

| Number | Name | Date |
| --- | --- | --- |
| 1,960,333 | DuMont | May 29, 1934 |
| 2,286,894 | Browne et al. | June 16, 1942 |
| 2,143,035 | Smith | Jan. 10, 1939 |
| 1,983,254 | Turner | Dec. 4, 1934 |
| 1,924,174 | Wolf | Aug. 29, 1933 |
| 2,243,234 | Von Duhn | May 27, 1941 |
| 2,227,598 | Lyman et al. | June 12, 1941 |
| 2,280,226 | Firestone | Apr. 21, 1942 |
| 2,188,970 | Wilson | Feb. 6, 1940 |

FOREIGN PATENTS

| Number | Country | Date |
| --- | --- | --- |
| 354,668 | Italian | Dec. 2, 1937 |
| 113,233 | Australian | June 12, 1941 |

Disclaimer 2,419,576.—*Maurice Moise Levy*, London, England. APPARATUS FOR MEASURING SHORT TIME INTERVALS. Patent dated Apr. 29, 1947. Disclaimer filed Mar. 16, 1951, by the assignee, *International Standard Electric Corporation*.

Hereby enters this disclaimer to claim 1; however, no disclaimer is entered to claims 2, 3, and 4, dependent upon claim 1, of said patent.

[*Official Gazette April 24, 1951.*]